(12) United States Patent
Nobukawa

(10) Patent No.: US 6,461,502 B1
(45) Date of Patent: Oct. 8, 2002

(54) APPARATUS FOR RECOVERING A SPECIFIC INGREDIENT IN SEA WATER

(75) Inventor: Hisashi Nobukawa, Higashihiroshima (JP)

(73) Assignee: Hiroshima University, Higashihiroshima (JP)

( * ) Notice: Subject to any disclaimer, the term of this patent is extended or adjusted under 35 U.S.C. 154(b) by 0 days.

(21) Appl. No.: 09/874,071

(22) Filed: Jun. 6, 2001

(30) Foreign Application Priority Data

Jun. 7, 2000 (JP) .................................. 2000-170543

(51) Int. Cl.$^7$ ............................. C02F 1/42; C02F 1/62
(52) U.S. Cl. .................. 210/170; 210/242.1; 210/265; 210/274; 210/747
(58) Field of Search .................. 210/170, 242.1, 210/242.4, 265, 274, 283, 682, 688, 747

(56) References Cited

U.S. PATENT DOCUMENTS

| | | | |
|---|---|---|---|
| 1,398,285 A | * 11/1921 | Tanner | 210/265 |
| 1,751,819 A | * 3/1930 | Kniesel | 210/274 |
| 4,168,971 A | * 9/1979 | Szczepanski | 210/688 |
| 4,172,039 A | * 10/1979 | Akiyama | 210/242.4 |
| 4,293,527 A | * 10/1981 | Morgan et al. | 210/682 |
| 4,416,860 A | * 11/1983 | Heitkamp et al. | 210/170 |
| 4,565,627 A | * 1/1986 | Langström et al. | 210/242.1 |
| 4,582,609 A | * 4/1986 | Hunter, III et al. | 210/170 |
| 4,911,835 A | * 3/1990 | Ishii et al. | 210/170 |
| 6,090,284 A | * 7/2000 | Melber et al. | 210/274 |

FOREIGN PATENT DOCUMENTS

JP          1-108324       * 4/1989

* cited by examiner

Primary Examiner—Christopher Upton
(74) Attorney, Agent, or Firm—Burns Doane Swecker & Mathis LLP

(57) ABSTRACT

An apparatus for recovering a specific ingredient in sea water, which comprises an adsorbing bed tank, a layer of an adsorbent charged on the bottom portion of the adsorbing bed tank, a sea water intake pipe provided in a bottom portion of the adsorbing bed tank, a sea water intake opening for taking in sea water and leading the sea water taken in to the sea water intake pipe, a communicating pipe communicating with an end of the sea water intake pipe, a precipitating section through which the communicating pipe communicates with the sea water intake opening, and an evacuator for discharging sea water inside the adsorbing bed tank, sea water inflow openings being provided between said sea water intake pipe and the tank and being provided with check valves, said check valve being adapted to only upwardly flow sea water into the adsorbent layer inside the adsorbing bed tank through the sea water inflow openings, wherein a sectional area of the precipitating section as taken perpendicularly to a flowing direction of sea water is larger than that of the sea water intake pipe.

14 Claims, 4 Drawing Sheets

APPARATUS FOR RECOVERING A SPECIFIC INGREDIENT IN SEA WATER

BACKGROUND OF THE INVENTION (1) Field of the Invention

The present invention relates to an apparatus for recovering a specific ingredient in sea water, particularly to an apparatus for recovering lithium in sea water.

(2) Related Art Statement

There are various ingredients dissolved and present in sea water. Recovery and effective utilization of such various ingredients are particularly effective for cases where land resources are poor. Recently, investigations and developments of adsorbents have proceeded, and excellent adsorbents for recovering ingredients in sea water have been developed. As such adsorbents, adsorbents for adsorbing lithium, uranium, etc. are known, for example. Lithium is dissolved almost uniformly in sea water at a rate of about 170 ppb. Uranium is dissolved in sea water at a far lower rate of about 3 ppb.

According to an apparatus for recovering such a specific ingredient in sea water, an adsorbent is fixedly held in sea water, and that ingredient is adsorbed with the adsorbent in the state that ocean current is being spontaneously contacting the ocean current (JP-A 01-108324).

There is known a further improved adsorbing apparatus in which while sea water is taken in upwardly, a specific ingredient is adsorbed onto the adsorbent during the intake period. This apparatus can recover the specific ingredient in sea water with no problem when sea is calm and it is fine with a constant waterline surface.

However, according to such prior art methods, when the adsorbent is fixed in sea water, the flow rate of the ocean current relative to the adsorbent is not constant and usually very small. Thus, there are problems that since the adsorbent is in a stationary state, the adsorbing speed decreases, and the specific ingredient in sea water around the adsorbent only is adsorbed to make sea water thin in that ingredient and consequently lessen the adsorbed amount of the ingredient. Further, it is difficult to move the adsorbing apparatus to a safe place in case of bad weather such as typhoon.

Further, it is difficult to prevent backward flow of sea water which would occur when the waterline surface lowers and thus the water level in the adsorbing bed tank rises higher than the waterline surface in the case that the conventional adsorbing apparatus is being effecting the adsorbing operation in sea waving. There is a problem that if the sea water flows backwardly in the adsorbing bed tank, the adsorbent in the tank flows out along the backward flow direction of the sea water.

Further, once the adsorbent flows out, it flows into sea as it is. Consequently, it is impossible to recover the adsorbent. Therefore, an adsorbing apparatus has been desired, which can control the flow-out direction of the sea water and recover the adsorbent again in the adsorbing bed tank even if it flows out. However, such an adsorbing apparatus has not been known yet.

SUMMARY OF THE INVENTION

It is an object of the present invention to provide a recovering apparatus which can prevent the adsorbent from flowing out of the adsorbing bed tank and effectively recover a specific ingredient in sea water, while only as little power energy as possible is used.

In order to accomplish the above-mentioned object, the present inventor contrived an apparatus in which a precipitating section is provided between a sea water intake opening and a sea water intake pipe for precipitating an adsorbent and a specific ingredient in sea water is recovered through by circulating sea water in the tank.

An apparatus for recovering a specific ingredient in sea water, which comprises an adsorbing bed tank, a layer of an adsorbent charged on the bottom portion of the adsorbing bed tank, a sea water intake pipe provided in a bottom portion of the adsorbing bed tank, a sea water intake opening for taking in sea water and leading the sea water taken in to the sea water intake pipe, a communicating pipe communicating with an end of the sea water intake pipe, a precipitating section through which the communicating pipe communicates with the sea water intake opening, and an evacuator for discharging sea water inside the adsorbing bed tank, sea water inflow openings being provided between said sea water intake pipe and the tank and being provided with check valves, said check valve being adapted to only upwardly flow sea water into the adsorbent layer inside the adsorbing bed tank through the sea water inflow openings. In the above, a sectional area of the precipitating section as taken perpendicularly to a flowing direction of sea water is preferably larger than that of the sea water intake pipe.

According to the recovering apparatus of the present invention, since the sectional area of the precipitating section as taken perpendicularly to a flowing direction of sea water is larger than that of the sea water intake pipe, the adsorbent can be prevented from rising up to the sea water intake opening, even if sea water flows backwardly into the adsorbing bed tank and the adsorbent flows out into the sea water intake pipe. The adsorbent which is collected in the precipitating section having the larger sectional area can return to the adsorbing bed tank following the flow of sea water, when the apparatus is restored to its normal operational state.

In this way, the precipitating section functions to reduce the flow rate of sea water flowing out or change the flowing direction thereof to collect the adsorbent contained in the sea water flowing backwardly. The precipitating section may be designed in the form of a tank. If the flowing direction is changed, the precipitating section may be formed by designing a part of the communicating pipe as extending vertically.

In the present invention, the wording "sea water inflow openings being provided between said sea water intake pipe and the tank and being provided with check valves" includes variations, for example, the sea water inflow openings are provided at the peripheral wall of the sea water intake pipe, or the check valves may be considered to constitute a part of the sea water intake pipe or a part of the bottom of the adsorbent bed tank.

In the following, preferred embodiments of the present invention will be explained. Any combination of such preferred embodiments will be considered as preferred embodiments of the present invention, unless any adverse effect occurs.

As a preferred embodiment of the present invention, a sea water discharge opening is provided at a side portion of the adsorbing tank for discharging the sea water. The sea water overflowing the adsorbing bed tank can be discharged through this discharge opening. According to another preferred embodiment of the present invention, a vertically movable type overflow gate is provided in an upper portion of the adsorbing bed tank, and sea water is discharged through this overflow gate.

Such an overflow gate can set the water level inside the adsorbing bed tank. The permeating flow rate of the sea water flowing through the adsorbent layer is determined by a difference in water head which is obtained by subtracting the water level inside the adsorbing bed tank from the water level of the waterline. Therefore, the permeating flow rate of the sea water flowing the adsorbing layer can be changed by the overflow gate.

According to a further preferred embodiment of the present invention, a sea water-storing tank is provided upstream of the discharging opening for storing sea water flowing out through the overflow gate.

Such a sea water-storing tank can more finely change the permeating flow rate of the sea water flowing through the adsorbent layer. Further, when a water discharge pump is used as the evacuator, the presence of sea water in the sea water-storing tank can prevent a non-load running state of the water discharge pump without necessitating the control of the water discharge pump.

According to a still further preferred embodiment of the present invention, an ejector is provided at the bottom portion of the adsorbing bed tank for ejecting compressed air into the adsorbing bed tank.

Since the compressed air is ejected into the tank by the ejector, the compressed air can float the adsorbent and make uniform the permeating flow rate of the sea water flowing through the adsorbent layer.

The compressed air can float the adsorbent, so that the sea water present among the adsorbent particles can be collected near the sear the sea water ducking near pipe at the bottom portion of the adsorbing bedtank.

According to a still further preferred embodiment of the present invention, a suction/discharge unit is provided at the bottom portion of the adsorbing bed tank for sucking and discharging sea water.

This suction/discharge unit can remove the sea water stored in the bottom portion of the adsorbing bed tank to the outside. Particularly when the above ejector is used in combination, sea water among the adsorbent particles can be collected to near the suction/discharge unit for removal of the sea water, since the adsorbent can be floated with the compressed air ejected through the ejector.

As a still further preferred embodiment of the present invention, a lateral displacement-preventing unit is provided inside the adsorbing bed tank. The lateral displacement-preventing unit functions to prevent the lateral displacement of the sea water and the adsorbent inside the adsorbing bed tank in bad weather.

This lateral displacement-preventing unit is not particularly limited, so long as it can prevent the lateral displacement. For example, plural partition walls may be provided discontinuously inside the adsorbing bed tank, or a partition wall having plural holes may be continuously provided. This lateral displacement-preventing unit can prevent a great amount of the sea water and the adsorbent from rapidly horizontally move. Thereby, the recovering operation can be stably effected.

As a still further preferred embodiment of the present invention, the apparatus is adapted to recover lithium in sea water through adsorption with the adsorbent.

As a still further preferred embodiment of the present invention, a pouring unit is provided for pouring a desorbing liquid into the adsorbing layer. The specific ingredient in sea water adsorbed onto the adsorbent can be desorbed with the desorbing liquid poured by the pouring unit.

These and other objects, features and advantages of the invention will be well appreciated upon reading the following description of the invention when taken in conjunction with the attached drawings, with the understanding that some modifications, variations and changes could be easily made by the skilled person in the art to which the invention pertains.

BRIEF DESCRIPTION OF THE DRAWINGS

For a better understanding of the invention, reference is made to the attached drawings, wherein.

DETAILED DESCRIPTION OF THE INVENTION

Embodiments of the recovering apparatus according to the present invention will be explained in more detail with reference to the attached drawings.

Figure 1A:
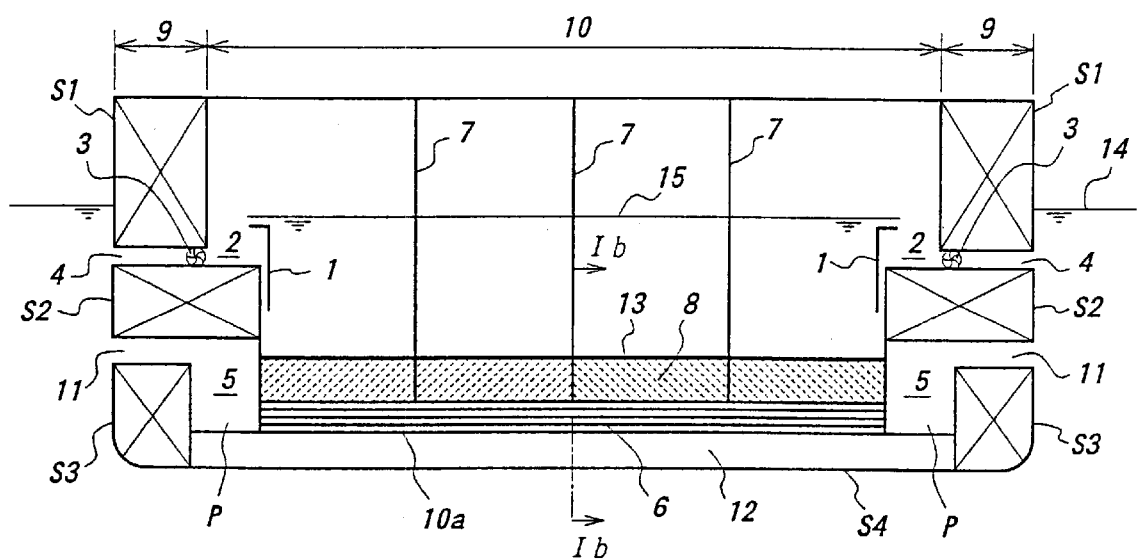
FIG. 1 is a sectional view of an embodiment of the recovering apparatus according to the present invention which is installed in a ship.
Figure 1B:
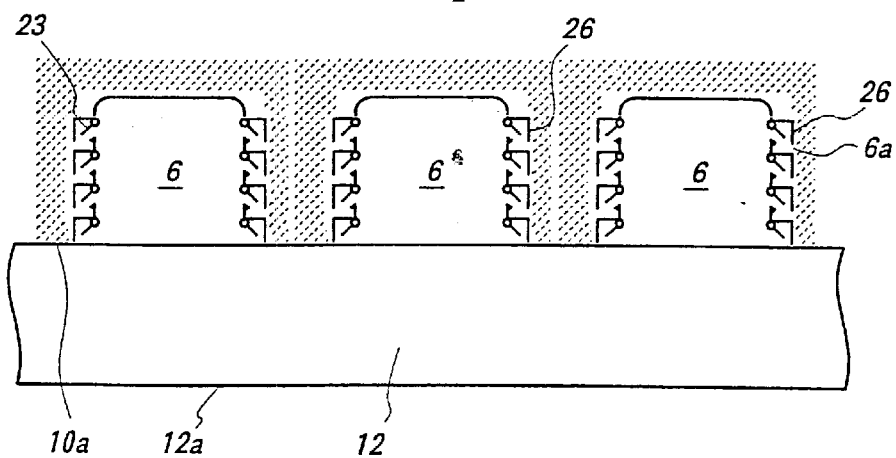

FIG. 1 is a sectional view of one embodiment of the recovering apparatus according to the present invention, which is installed in a ship.

Figure 5:
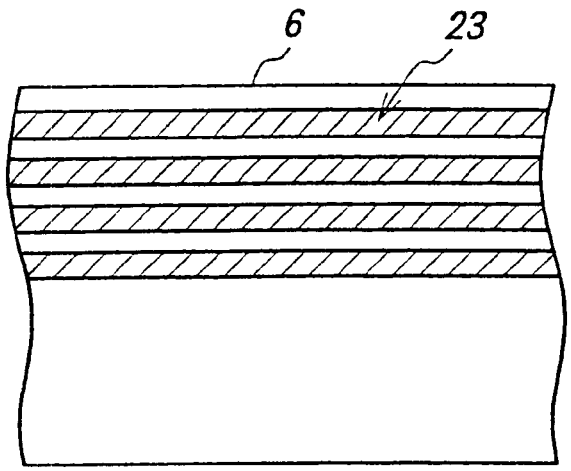
FIG. 5 is a side view of an adsorbing bed tank.
Figure 6:
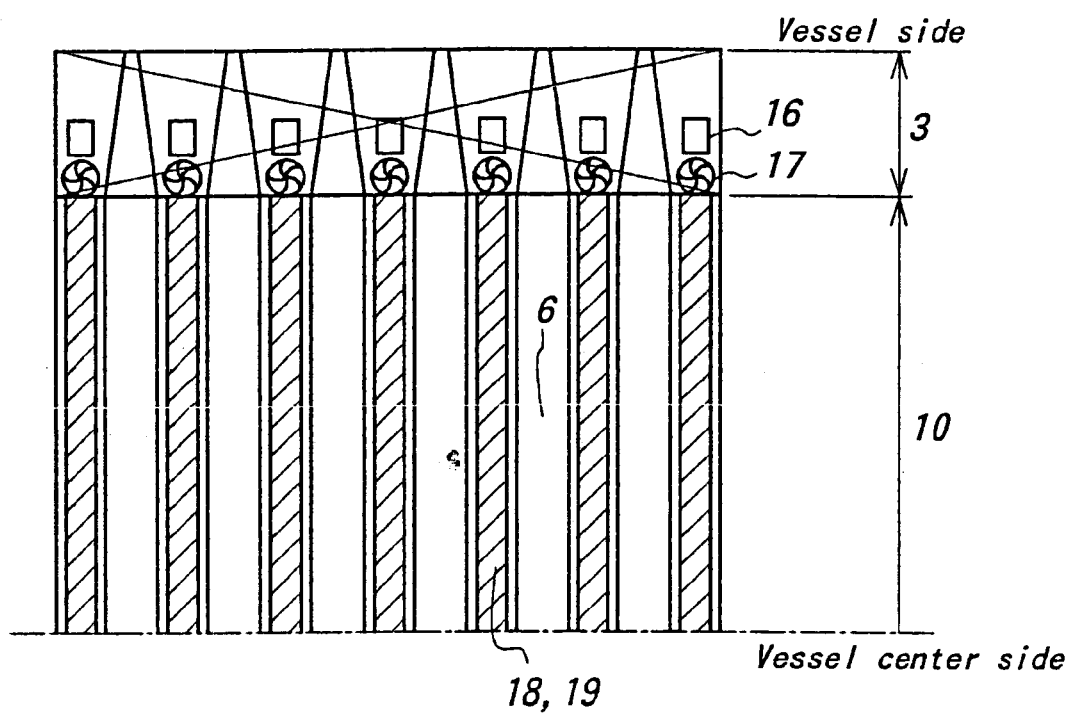
FIG. 6 is a plane view of the adsorbing bed tank of the embodiment in FIGS. 2 and 3.

In FIG. 1($a$), S1, S2, S3 denote a sidewall of a ship-shaped vessel (ballast tanks or buoyant tanks), and S4 a bottom portion of the vessel, and an adsorbing bed tank 10 is defined or installed inside the vessel. A layer of an adsorbent, 8, is charged or piled on the bottom portion of the adsorbing bed tank 10, and sea water intake pipes 6 are provided or laid in a bottom portion of the adsorbing bed tank 10 at a specific interval as shown in FIG. 1($b$) and FIG. 6. Each sea water intake pipe 6 has a U-shaped section, and has sea water inflow openings 6$a$ at each side of the pipe 6 which are arranged in vertically plural stages. A check valve 23 is provided at each sea water inflow opening 6$a$ such that the check valve allows the flow of the sea water from the sea water intake pipe 6 to the adsorbing bed tank 10, while preventing the flow in the reverse direction. FIG. 5 schematically illustrates a side view of the sea water intake pipe with plural check valves 23.

Sea water intake openings 11 are provided in each of the sidewalls of the vessel in a horizontal line, while being spaced from adjacent one or ones. The sea water intake openings 11 are formed through the buoyancy tanks 9 at the opposite sides. Although the height of the sea water intake opening is the same level as that of the adsorbent 8 in FIG. 1($a$), no limitation is posed so long as the sea water intake openings are located higher than the sea water intake pipe 6. A communicating pipe 5 is provided to communicate with a sea water intake opening 11 and an end of a sea water intake 6 pipe corresponding to this communicating pipe 5. The sea water intake opening 11 is preferably provided at the same level as the upper surface of the adsorbent layer 8 to prevent the adsorbent from coming outside through the sea water intake opening 11. The sea water intake openings 11 are adapted for taking in sea water and leading the sea water taken in to the sea water intake pipes through the communicating pipes.

A precipitating section P is provided at a location through which one communicating pipe 5 communicates with the corresponding sea water intake opening 11. An evacuator 3 such as a drain pump, which is provided in each of sea water discharge openings 4 formed in each of the sidewalls of the vessel in a line at a given interval. The evacuator 3 is to discharge sea water above the adsorbent layer inside the adsorbing bed tank 10. In this embodiment, the sectional area of the precipitating section P as taken perpendicularly to a flowing direction of sea water is larger than that of the sea water intake pipe 6.

An overflow gate 1 is provided near the sea water discharge openings 4 at each of the sidewalls such that a sea water-storing portion 2 is defined upstream the sea water discharge openings and between the sidewall and the overflow gate 1. The overflow gate 1 is to set the water level inside the adsorbing bed tank 10. The overflow gate may be vertical movable by an appropriate means. The sea water-storing portion is to store sea water overflowing the overflow gate 1. Lateral displacement-preventing unit 7 comprising vertical walls with numerous holes are spaced from adjacent one or ones by a given interval and erected from the bottom of the adsorbing bed tank 10 through the adsorbent layer 8. The adsorbing bed tank 10 moves on waves of sea water during sea water waving, which horizontally displace the adsorbent and sea water in the adsorbing bed tank. The partition walls 7 are to prevent lateral rapidly horizontal displacement of a large amount of the adsorbent in the adsorbing bed tank 10 and to enable stable adsorbing of a specific ingredient in sea water.

In FIG. 1(a), a bottom space 12 is defined between the bottom 10a of the adsorbent bed tank 10 and a bottom 12a of the vessel. Reinforcing members (not shown) are arranged between the bottom 10a of the adsorbent bed tank 12 and the bottom 12a of the vessel so as to support (preferably keep flat) the load applied upon the bottom 10a of the adsorbent bed tank 10. The bottom space may be considered to function as a buoyancy tank in a sense as in the case of the ballast tanks S3, S3.

A network mat 13 is placed on the adsorbent layer 8 so that the mat 13 may prevent excess floating of the adsorbent and make uniform the adsorbent in the adsorbent layer 8. Reference numerals 14 and 15 denote the waterline of sea water and the surface level of the sea water inside the adsorbing bed tank 10, respectively.

The flow of the sea water will be briefly explained. Sea water enters through the sea water intake openings 11. Next, sea water enters into the sea water intake pipes 6 in the bottom portion of the adsorbing bed tank through the communicating pipes 5. Sea water entering the sea water intake pipes 6 goes into the adsorbing bed tank 10 through the check valves 23 at the sea water inflow openings in the bottom portion of the tank 10. Then, sea water overflows the adsorbing bed tank after passing the adsorbent layer 8 in the bottom portion of the adsorbing bed tank 10. The flow of the sea water will be explained in more detail.

The water level surface of the overflow gate 1 is preliminarily set at the same level as that of the waterline 14. When sea water is fed into the buoyancy tanks at the opposite sides of the adsorbing bed tank 10 to adjust the waterline as desired, sea water enters through the sea water intake openings 11.

The sea water entering through the sea water intake openings 11 passes the communicating pipes 5, and flows into the sea water intake pipes 6 through the precipitating sections P. Then, the sea water passes the sea water inflow openings 6a, passes the granular adsorbent 8, and rises to the water level surface 15 of the overflow gate 1 in the adsorbing bed tank 10.

The overflow gate 1 can be utilized to adjust the flow rate of sea water passing the adsorbent layer. The passing flow rate is determined by a difference in water head obtained by subtracting the water level inside the adsorbing bed tank from the water level of the waterline. Therefore, if the output of the evacuator and the water level are adjusted to meet the designed passing flow rate in the state that the water level of the adsorbing bed tank is kept constant at the time of adsorbing operation, the passing flow rate of sea water through the adsorbent layer can be freely controlled. This water head is not particularly limited, but about 150 to 250 mmH$_2$O is preferable. At that time, the flow rate of sea water in the adsorbing bed tank is around 2 to 5 cm/s.

The sectional area of the communicating pipe (precipitating section) as taken perpendicularly to the inflow direction of sea water in the communicating pipe is set larger than the sectional area of the sea water intake pipe. Thereby, even if sea water flows backwardly to discharge the adsorbent into the sea water intake pipe, the adsorbent can be prevented from rising the sea water intake opening.

Sea water entering the sea water intake pipes from the communicating pipes through the precipitating sections goes into the adsorbing bed tank through the sea water intake openings in the bottom portion of the adsorbing bed tank. At this time, since the check valves are arranged in the sea water intake openings, the sea water flows only in one direction from a downside to an upper side, so that the adsorbent can be prevented from being flown outside from the adsorbing bed tank. Therefore, even if the waterline surface lowers and the water level inside the adsorbing bed tank rises beyond the waterline surface when the recovering apparatus is under adsorbing operation in waving, the backward flow of a mixture of sea water and the adsorbent inside tank which would flow backwardly into the sea water intake pipes through the sea water inflow openings can be prevented from flowing backwardly because of the provision of the check valves at the sea water inflow openings.

The waterline 14 for the recovering apparatus-provided vessel is adjusted by feeding sea water into the ballast tanks S1 to S3 or draining sea water therein. The surface level 15 of sea water inside the adsorbing bed tank is adjusted by vertically moving the overflow gates. The overflow gates are adjusted so that the surface level 15 of the sea water inside the adsorbing bed tank may be lower than the waterline 14 for the adsorbing bed tank to effect the adsorbing treatment of sea water.

Sea water passes the check valves 23, enters into the adsorbing bed tank, and passes the adsorbent layer 8. At that time, a specific ingredient in sea water is adsorbed onto the adsorbent, which enables recovering of that specific ingredient from the sea water. For example, if lithium is to be recovered from sea water, a magnesium oxide-based granular adsorbent is used, whereas if uranium is to be recovered, acrylic fibers may be used.

The sea water passes the adsorbing layer 8, rises inside the adsorbing bed tank 10, and reaches the sea water level being the same level as that of the overflow gate 1. The sea water overflowing the overflow gate is discharged through the evacuator 3.

In this embodiment, since the sea water-storing portion 2 is provided downstream of the overflow gate 1, the sea water overflowing the overflow gate is stored in the sea water-storing portion. Should the waterline surface descend during sea water waving to expose the sea water discharge openings above the waterline, the presence of the sea water-storing portion can prevent a non-load operation of the pump.

Since the sea water-storing tanks are provided, sea water is stored in the sea water-storing tank 2, so that the waterline surface 14, the surface level 15 of the sea water inside the sea water-storing tank and that of the adsorbing bed tank are of the same level. Discharging sea water with the evacuator 3 causes the same amount of new sea water to enter through the sea water intake opening 11.

The locations of the drain pipes 4 are not limited. However, when the locations of the drain pipes are of the same level as that of the waterline surface, a difference in water head can be made as small as possible, the consumption energy for the evacuator can be lessened.

Next, another embodiment of the present invention will be explained.

Figure 2:
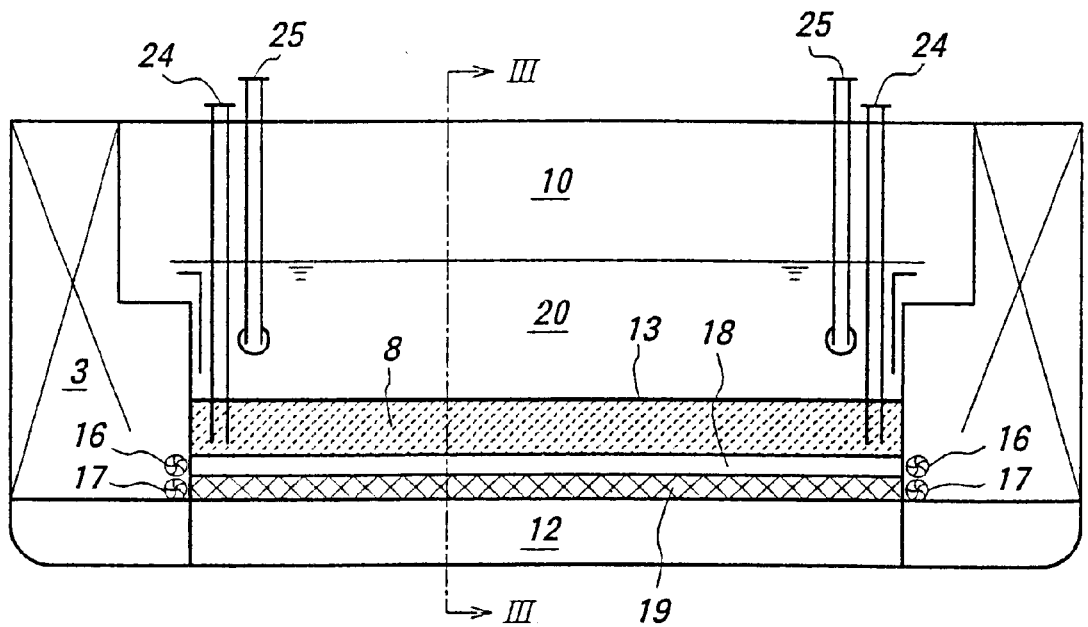
FIG. 2 is a sectional view of another embodiment of the recovering apparatus according to the present invention.
Figure 3:
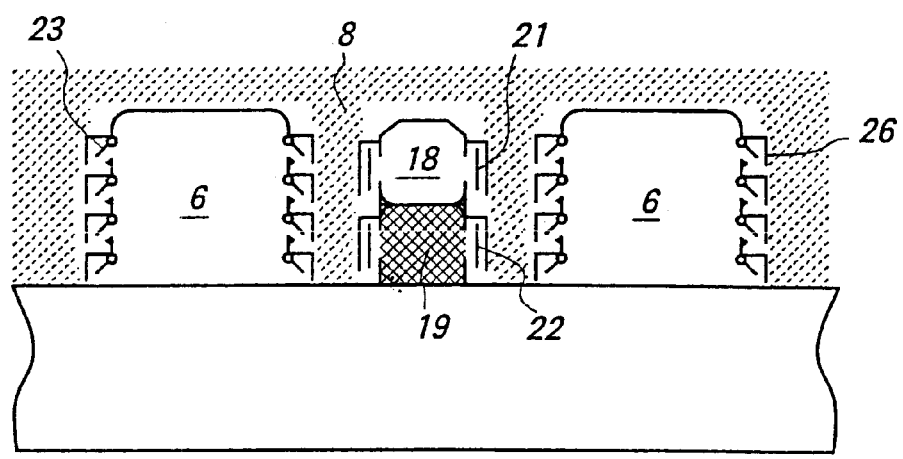
FIG. 3 is a sectional view of the apparatus in FIG. 2 taken along a ling III—III.

FIG. 2 is a sectional view of the recovering apparatus according to the present invention, and FIG. 3 is a sectional view of the recovering apparatus in FIG. 3 taken along with a line III—III In the following, explanation will be made principally with respect to different features of this embodiment from that in FIGS. 1(*a*) and 1(*b*).

Between adjacent sea water intake pipes 6 laid on the bottom of the adsorbing bed tank are installed an ejector 18 and a sucking/discharging unit 19 as shown in FIG. 2. Reference numerals 16 and 17 are an ejector pump and a sucking/discharging pump arranged at each end of the ejector 18 and the sucking/discharging unit 19, respectively. The sucking/discharging pump 16 and the ejector pump (e.g., air compressor) 17 are communicated with a discharging port and open air, respectively (not shown). The ejector 18 is has compressed-air ejecting valves 21, which is opened to eject compressed air into the adsorbent 8 inside the adsorbing bed tank 10. The sucking/discharging unit 19 has suction valves 22, which is opened to suck and discharge sea water in the bottom portion of the adsorbing bed tank 10.

A desorbing liquid-pouring pipe 24 is inserted into the adsorbent layer 8, and connected to a desorbing liquid source (not shown) above the adsorbing bed tank 10. A desorbing liquid is fed into the adsorbent layer through the pouring pipe 24. A residual sea water recovering pipe 25 is inserted to recover sea water inside the adsorbing bed tank 10, in addition to the sea water discharge openings 4 shown in FIG. 1(*a*).

Next, the recovering apparatus in this embodiment will be explained along with the flowing of sea water.

Sea water enters through the sea water intake openings 11, and goes into the adsorbing bed tank 10 though the sea water intake pipes 6. When sea water passes the adsorbent layer 8 charged into the adsorbing bed tank, the penetrating flow rate of the sea water through the adsorbent layer is not uniform, if the adsorbent charged is in a compacted state due to the self weight thereof. Therefore, it may be difficult to effectively make the adsorption operation.

In view of this, compressed air may be utilized for making effective adsorption.

In FIG. 3, the open valves 21 of the air ejecting pipe 18 arranged at the bottom of the adsorbing bed tank are opened to feed compressed air into the adsorbent layer. While the adsorbent is being floated with compressed air, uniform permeating flow of sea water can be assured through the entire region of the adsorbent layer by passing the sea water through the adsorbent layer.

Since the network mat 13 having a mesh with a mesh diameter similar to those of adsorbent particles covers the upper face of the adsorbent layer, excess floating of the adsorbent and the locally upward erupting of air from the surface of the adsorbing layer can be suppressed to enhance the effect obtained by introducing air into the adsorbent layer and prevent the flow-out of the adsorbent from the adsorbing bed tank.

Figure 4:
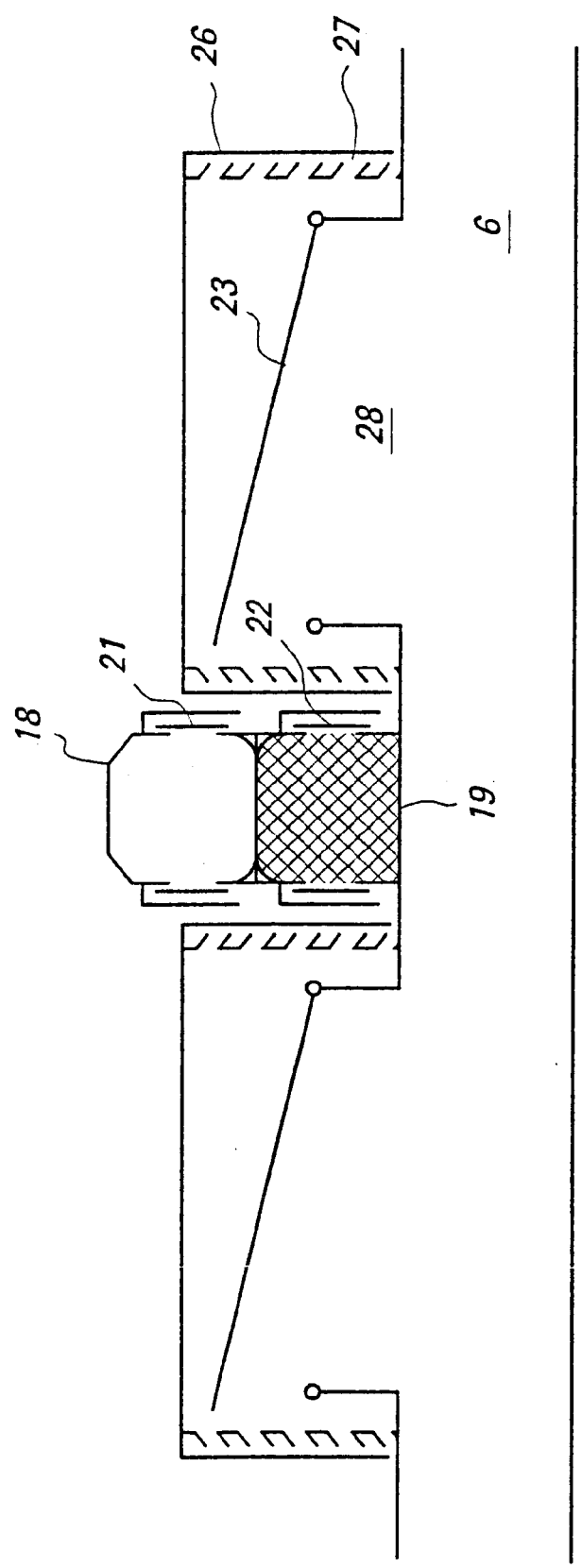
FIG. 4 is a sectional view of a still further embodiment of the recovering apparatus according to the present invention near sea water inflow openings with check valves.

FIG. 4 shows a further embodiment of the present invention. In this embodiment, sea water inflow openings 28 are provided between the sea water intake pipe and the bottom of the adsorbent bed tank. The check valve 23 is provided at the sea water inflow opening 28, and a cover 26 with slits 27 are provided to ensure operation of the check valve 23 therein. In this embodiment, the check valves may be considered to constitute a part of the bottom of the adsorbent bed tank or a part of the sea water intake pipe 6.

Next, an operation from the adsorption step to the desorption step will be explained. First, the water level of sea water in the adsorbing bed tank is descended under the sea water intake openings. That is, sea water 20 which passed the adsorbent and collected in the adsorbing bed tank is removed. The sea water can be removed by the evacuator through the residual sea water recovering pipe 25. The tank water-recovering pipe may be connected to the sea water-storing tank so that sea water may be evacuated with another discharging unit.

When the network mat 13 is used at this time, only the permeated sea water collected on the adsorbent can be sucked through without sucking the adsorbent particles into the pump. Further, the use of the mat 13 can prevent the adsorbent from flowing out of the adsorbing bed tank.

Then, sea water remaining in the adsorbent is removed. The adsorbent is floated by ejecting the compressed air into the adsorbent layer, and thereby sea water among the adsorbent particles can be collected near the sea water sucking/discharging pipes in the bottom portion of the tank.

After the sea water in the adsorbing bed tank is removed, the desorbing liquid is fed into the adsorbent layer. The desorbing liquid is fed into and stirred with the adsorbent layer, the specific ingredient adsorbed onto the adsorbent is desorbed. At that time, while the desorbing liquid being fed into the adsorbent layer, compressed air may be injected into the adsorbent layer. The compressed air can effectively stir the desorbing liquid with the adsorbent, which can enhance the desorbing efficiency. Several %, for example 2% of hydrochloric acid aqueous solution may be used. Besides this, about 1 to 5% aqueous solution of sulfuric acid, nitric acid or phosphoric acid may be used.

Sea water collected in the bottom portion of the adsorbent bed is sucked and recovered through the filter medium-filled sucking pipe 19 by opening the check valves 22. After the suction pipe 19 is operated, the valves 22 of the filter medium-filled suction pipe are closed. On the other hand, after the ejecting pipe 18 is operated, the air ejecting valves 21 are closed.

In the same manner, when the apparatus goes from the desorbing step to the adsorbing step, the desorbing liquid is completely removed from the adsorbent charged, and washed with fresh water, and the resultant liquid is drained. In this case, water in the adsorbent needs to be removed. The desorbing liquid in the adsorbent can be removed by using the above method used for removing the sea water.

Next, a case of recovering uranium will be explained. The above apparatus for recovering the specific ingredient in sea water can be used in recovering uranium. Therefore, mention may be made on matters peculiar to uranium. As the adsorbent, silbaron-based polyacrylonitrile fibers may be used. A method for charging or piling the adsorbent is not particularly limited. For example, a bundled fiber-type adsorbent in which fibers may be collected in a diameter of 3 mm and bundled at a center in a longitudinal direction thereof may be used. The height of the adsorbent layer is 18 cm, for example. The operational method is as mentioned above. Since the size of each of the adsorbents is large, the void percentage in the adsorbing bed tank is high. Therefore, the final flow water of sea water passing the adsorbing bed tank is as much as about 8 cm/sec. for the same water head. That is, since the flow amount of sea water passing through the apparatus is large, the volume of the sea water discharge pump becomes larger correspondingly.

The recovering apparatus in the present invention a far smaller power energy used and more economical as compared with the conventional apparatus.

The present invention is not limited to the above-mentioned embodiments only, and various modifications, variations and changes may be made. Specific ingredients in sea water other than liquid and uranium, for example, manganese, calcium or the like may be recovered.

According to the present invention, the specific ingredient (s) in sea water can be effectively and advantageously recovered.

Further, according to the present invention, the adsorption and desorption of the specific ingredient may be advantageously effected in one apparatus.

Furthermore, according to the recovering apparatus of the present invention, the specific ingredient may be recovered, while the apparatus is drafting, not staying in a constant zone. The specific ingredient can be advantageously recovered without decreasing the concentration thereof.

What is claimed is:

1. An apparatus for recovering a specific ingredient in sea water, comprises an adsorbing bed tank, a layer of an adsorbent charged on the bottom portion of the adsorbing bed tank, a sea water intake pipe provided in a bottom portion of the adsorbing bed tank, a sea water intake opening for taking in sea water and leading the sea water taken in to the sea water intake pipe, a communicating pipe communicating with an end of the sea water intake pipe, a precipitating section through which the communicating pipe communicates with the sea water intake opening, and an evacuator for discharging sea water inside the adsorbing bed tank, sea water inflow openings being provided between said sea water intake pipe and the tank and being provided with check valves, said check valve being adapted to only upwardly flow sea water into the adsorbent layer inside the adsorbing bed tank through the sea water inflow openings, wherein a sectional area of the precipitating section as taken perpendicularly to a flowing direction of sea water is larger than that of the sea water intake pipe.

2. The apparatus set forth in claim 1, wherein said sea water intake pipe is arranged above the bottom of the adsorbing bed tank, and said sea water inflow openings are provided at a peripheral wall of the sea water intake pipe.

3. The apparatus set forth in claim 2, which further comprises a vertically movable type overflow gate provided in an upper portion of the adsorbing bed tank, said sea water being discharged through said overflow gate.

4. The apparatus set forth in claim 3, which further comprises a sea water-storing tank provided upstream of the discharging opening for storing sea water flowing out through the overflow gate.

5. The apparatus set forth in claim 1, which further comprises a sea water discharge opening is provided at a side portion of the adsorbing tank for discharging the sea water.

6. The apparatus set forth in claim 1, which further comprises an ejector provided at the bottom portion of the adsorbing bed tank for ejecting compressed air into the adsorbing bed tank.

7. The apparatus set forth in claim 1, which further comprises a suction/discharge unit provided at the bottom portion of the adsorbing bed tank for sucking and discharging sea water.

8. The apparatus set forth in claim 1, which further comprises a lateral displacement-preventing unit.

9. The apparatus set forth in claim 8, wherein the lateral displacement-preventing unit comprises a partition wall having plural holes.

10. The apparatus set forth in claim 1, which is adapted to adsorb and recover lithium in sea water.

11. The apparatus set forth in claim 1, which further comprises a pouring unit for pouring a desorbing liquid into the adsorbing layer.

12. The apparatus set forth in claim 1, which further comprises a buoyancy unit for adjustably floating the adsorbing bed tank in sea water.

13. The apparatus set forth in claim 1, which further comprises a vertically movable type overflow gate provided in an upper portion of the adsorbing bed tank, said sea water being discharged through said overflow gate.

14. The apparatus set forth in claim 13, which further comprises a sea water-storing tank provided upstream of the discharging opening for storing sea water flowing out through the overflow gate.

* * * * *